United States Patent
Koller et al.

(10) Patent No.: US 9,301,185 B1
(45) Date of Patent: Mar. 29, 2016

(54) MOBILE COMMUNICATION EXTENDED ERROR CODES AND DYNAMIC ERROR HANDLING

(71) Applicant: Sprint Communications Company L.P., Overland Park, KS (US)

(72) Inventors: Gary D. Koller, Overland Park, KS (US); Mark D. Peden, Olathe, KS (US); Raymond E. Reeves, Oviedo, FL (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 26 days.

(21) Appl. No.: 14/250,379

(22) Filed: Apr. 10, 2014

(51) Int. Cl.
*G06F 11/00* (2006.01)
*H04W 24/10* (2009.01)
*G06F 9/46* (2006.01)
*G06F 17/30* (2006.01)
*G06F 11/36* (2006.01)
*H04W 24/04* (2009.01)

(52) U.S. Cl.
CPC .............. *H04W 24/10* (2013.01); *G06F 9/465* (2013.01); *G06F 11/3692* (2013.01); *G06F 17/30082* (2013.01); *H04W 24/04* (2013.01)

(58) Field of Classification Search
USPC .................. 455/73, 456.3, 452.2, 453, 456.1; 370/242, 235, 328, 252
See application file for complete search history.

(56) References Cited

U.S. PATENT DOCUMENTS

| | | | | |
|---|---|---|---|---|
| 7,685,224 | B2 * | 3/2010 | Nye ...................... | H04L 63/104 709/201 |
| 2005/0240943 | A1 * | 10/2005 | Smith ..................... | G06F 9/465 719/328 |
| 2006/0259949 | A1 * | 11/2006 | Schaefer ........... | G06F 17/30082 726/1 |
| 2010/0306590 | A1 * | 12/2010 | Anand ................. | G06F 11/3692 714/32 |
| 2012/0246470 | A1 * | 9/2012 | Nicolson .................. | G06F 21/57 713/158 |
| 2013/0242754 | A1 * | 9/2013 | Shaikh .................. | H04W 24/04 370/242 |
| 2014/0280398 | A1 * | 9/2014 | Smith ..................... | G06F 9/544 707/825 |

* cited by examiner

*Primary Examiner* — Ganiyu A Hanidu (57) ABSTRACT

A mobile communication device comprises a radio, a processor, a memory, and an application stored in the memory. When executed by the processor, the application analyzes an error code received via the radio and searches an error code to executable mapping table based on the error code. When the error code is associated with an entry in the error code to error handler executable mapping table, the application invokes an error handler executable identified by the entry.

17 Claims, 7 Drawing Sheets

MOBILE COMMUNICATION EXTENDED ERROR CODES AND DYNAMIC ERROR HANDLING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may give users access to a wide variety of functionalities. For example, a mobile communication device may allow a user to make telephone calls, send SMS messages, access the internet, etc. From time to time, users may experience errors while using their mobile communication devices. The errors may be related to voice communication, data communication, failure to connect, or the errors may result from and be related to failures of other functionalities. When an error occurs on a mobile communication device, the core network may detect the error and may send a standardized error code to the mobile communication device. The standardized error code may comprise a simple message configured to indicate that the mobile communication device has experienced a failure to perform a functionality. For example, the standardized error code may comprise the message "Network Failure." A user experiencing an error may contact his/her service provider in order to remedy the error.

SUMMARY

In an embodiment, a mobile communication device is disclosed. The mobile communication device comprises a radio transceiver, a processor, a memory, and an application stored in the memory that, when executed by the processor, analyzes an error code received via the radio transceiver, where the error code comprises a standardized error code and a business error code. The application further searches an error code to error handler executable mapping table based on the error code, and invokes an error handler executable identified by the entry when the error code is associated with an entry in the error code to error handler executable mapping table.

In another embodiment, a method of handling a communication error on a mobile communication device is disclosed. The method comprises searching an error code to error handler executable mapping table stored in the mobile communication device for an entry associated with a present error code and requesting an error handler executable based on the present error code from an error handler executable data store via a radio transceiver of the mobile communication device when an entry associated with the present error code is not found in the error code to error handler executable mapping table. The method further comprises storing a received error handler executable in a memory of the mobile communication device, creating an entry in the error code to error handler executable mapping table that associates the current error code to a location in the memory of the received error handler executable, and executing the received error handler executable.

In another embodiment, a method of handling a communication error on a mobile communication device is disclosed. The method comprises receiving a plurality of present error codes from a wireless communication network via a radio transceiver of the mobile communication device, searching an error code to error handler executable mapping table stored in a memory of the mobile communication device for a first entry associated with a first present error code of the plurality of present error codes, and executing on the mobile communication device an error handler executable identified by the entry associated with the first present error code when the entry associated with the first present error code is found in the error code to error handler executable mapping table. The method further comprises searching an error code to error handler executable mapping table stored in a memory of the mobile communication device for a second entry associated with a second present error code of the plurality of error codes and requesting an error handler executable based on the second present error code from an error handler executable data store via a radio transceiver of the mobile communication device when the entry associated with a second present error code is not found in the error code to error handler executable mapping table. The method further comprises storing a received error handler executable in the memory of the mobile communication device, creating an entry in the error code to error handling executable mapping table that associates the second present error code with a location in the memory of the received error handler executable, and executing the received error handler executable.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In mobile communications, a mobile communication device experiencing a failure may receive a standardized error code generated by the network. In many cases, the standardized error code may divulge little, if any, information that is meaningful to a user of the mobile communication device. For example, a standardized error code indicating "Network Error" may be sent to the mobile communication device when the mobile communication device fails to connect to the network. Based on the received standardized error code, the user may understand that the mobile communication device is failing to connect to the network but may not know how to remedy the problem.

The user may repeatedly attempt to connect to the network without success before finally contacting customer care. With the current error resolution system, the user may experience frustration resulting from receipt of unintelligible standardized error codes and an inability to correct the problem without contacting customer care. The present disclosure teaches systems and methods for a dynamic error handling framework that may allow a mobile communication device to act (e.g., self-heal) in response to receipt of a standardized error code and/or a business code. Implementation of the dynamic error handling framework disclosed herein may improve user satisfaction by reducing user frustration following receipt of a standardized error code.

In an embodiment, an error code comprising a standardized error code and a business code may be sent from the network to a mobile communication device in response to a mobile communication device failure, such as a failure to connect to the network. In some cases, the standardized error code and the business code may be sent together. In other cases, the standardized error code and the business code may be sent separately. For example, the standardized error code may be sent to the mobile communication device first and may be used to obtain the business code.

The standardized error code may indicate a failure to connect but may not indicate the reason. The business code coupled with the standardized error code may be configured to indicate the reason for the failure. For example, when a mobile communication device experiences a data failure, the standardized error code may indicate that there has been a data failure, and the business code may indicate that the reason for the failure is that the mobile communication device isn't provisioned for a data connection. Failures of the same type that occur for different reasons may result in the transmission of the same standardized error code, but the business code sent with the standardized error code may vary based on the reason for the failure experienced.

When an error code comprising a standardized error code and business code is received by the mobile communication device, an application on the mobile communication device may search a mapping table for an entry that matches the error code received. The entry may link to an error handler executable stored in the memory of the mobile communication device that may be configured to handle the failure indicated by the error code. When an entry that matches the received error code is found, the application may execute the error handler executable identified by the entry.

Executing the error handler executable may correct the failure experienced by the mobile communication device. Information about the failure may or may not be provided to a user of the mobile communication device when the error handler executable corrects the failure. In some cases, the error handler executable may be unable to correct the failure but may provide information about the failure to a user of the mobile communication device. The information provided to the user may allow the user to understand the reason for the failure and make educated decisions about how to correct the failure.

If an entry that matches the received error code is not found, then the application may request an appropriate error handler executable from the network. The network may use the error code received by the mobile communication device to identify an error handler executable configured to handle the failure that resulted in the receipt of the error code. The error handler executable identified by the network may be sent to the mobile communication device and may be invoked by the application in order to address the failure. Following receipt of the error handler executable from the network, the application may create an entry in the mapping table that matches the received error code to the error handler executable such that the error handler executable may be invoked without referring to the network when the mobile communication device experiences the same failure in the future.

In an embodiment, error handler executables may be configured to expire after a threshold time or an expiration rule has been satisfied. The mapping table and/or the application may keep track of whether or not error handler executables have expired. The application may pull down a replacement error handler executable from the network if an error handler executable has expired. Replacement error handler executables may be pulled down at times of low activity and/or at other times. The dynamic nature of the mapping table may allow the mobile communication device to maintain a plurality of up to date error handler executables configured to cure failures experienced by the mobile communication device.

The systems and methods described herein may allow a mobile communication device to self-heal by executing an error handler executable based on a standardized error code and a business code. This may reduce user frustration associated with mobile communication device failures by reducing user confusion that may arise from receiving a standardized error code by itself. Further, the systems and methods described herein may reduce the incidence of calls to customer care resulting from inability of a mobile communication device user to correct a failure.

Figure 1:
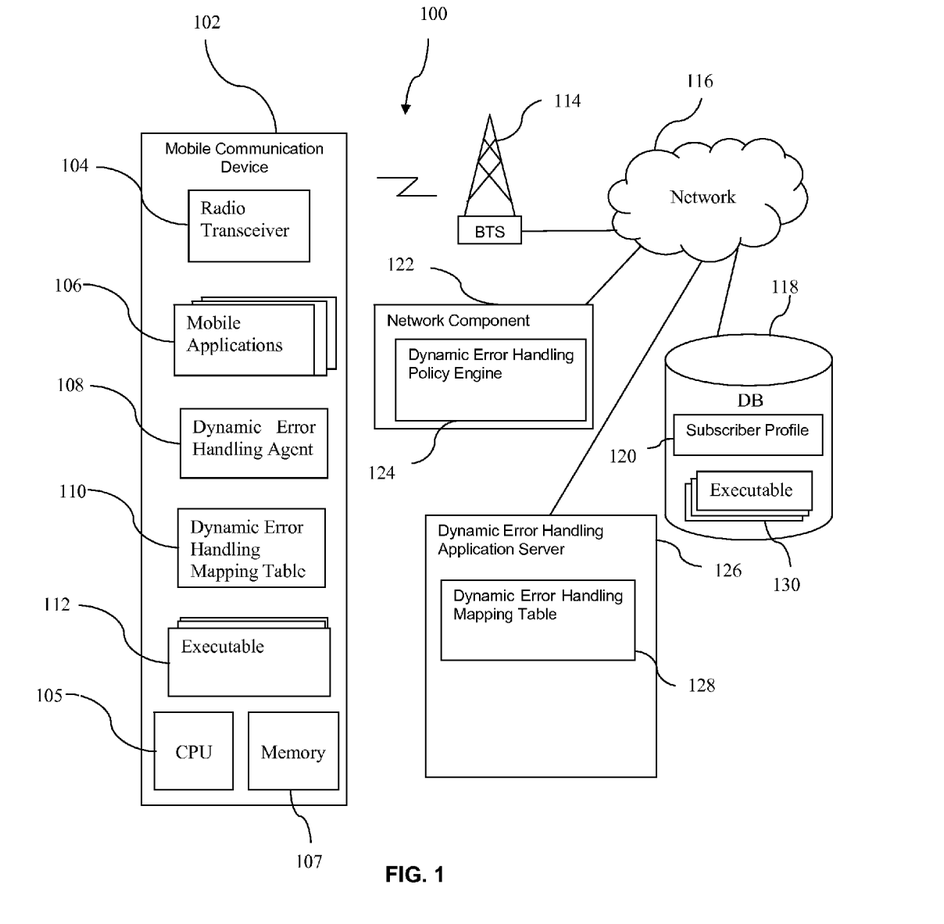
FIG. 1 is an illustration of a communication system according to an embodiment of disclosure.

Turning now to FIG. 1, a communication system 100 is described. In an embodiment, the communication system 100 comprises a mobile communication device 102, a base transceiver station (BTS) 114, a network 116, a data store 118, a dynamic error handling application server 126, and a network component 122. The mobile communication device 102 may comprise a radio transceiver 104, a processor (CPU) 105, one or more mobile applications 106, a memory 107, a dynamic error handling agent 108, a dynamic error handling mapping table 110, and one or more error handler executables 112 which may be preloaded on the mobile communication device 102.

The mobile applications 106 may comprise a variety of applications that are preloaded or otherwise installed on the mobile communication device 102 such as a calendar application, a short message text application, an internet access application, an email application or other applications. The mobile applications 106 may be stored as firmware or software in a mobile communication device 102. The memory 107 may be divided into a system partition, a carrier partition, and a user partition as described hereinbelow with reference to FIG. 5.

In an embodiment, the dynamic error handling agent 108 may be stored in the system partition, the dynamic error handling mapping table 110 may be stored in the carrier partition, and the error handler executables 112 may be stored in the carrier partition. Alternatively, the dynamic error handling agent 108, the dynamic error handling mapping table 110, and the error handler executables 112 may be stored in other locations. In some contexts, the dynamic error handling mapping table 110 may be referred to as an error to error handler executable mapping table or simply as a mapping table. The mobile communication device 102 may comprise a mobile phone, a media player, a personal digital assistant (PDA), a wireless communication enabled laptop computer, a wireless communication enabled tablet computer, a wireless communication enabled notebook computer, and/or other devices.

The mobile communication device 102 may be configured to use the radio transceiver 104 to establish a wireless communication link with the base transceiver station 114, and the base transceiver station 114 may provide communications connectivity to the network 116. The network 116 may comprise any combination of private and public networks. It should be understood that the communication system 100 may comprise any number of mobile communication devices 102 and any number of base transceiver stations 114. The collectivity of base transceiver stations 114 may be said to comprise a radio access network, in that these base transceiver stations 114 may provide radio communication links to mobile communication devices 102 to provide access to the network 116.

The radio access network may be abstracted in different ways and may comprise, in addition to the base transceiver stations 114, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication device 102. The radio transceiver 104 may communicate with the base transceiver station 114 using a wide variety of wireless communication protocols including a code division multiple access (CDMA) wireless communication protocol, a global system for mobile communication (GSM) wireless communication protocol, a long-term evolution protocol (LTE) wireless communication protocol, a world-wide interoperability for microwave access (WiMAX) wireless communication protocol or any other wireless communication protocol.

In an embodiment, the data store 118 may comprise one or more subscriber profiles 120 and one or more error handler executables 130. The subscriber profile 120 may comprise information related to a user subscription associated with the mobile communication device 102. The information contained in the subscriber profile 120 may comprise subscription information, account history, address, age, marital status, education level, income level, data usage, patterns, service plan type, demographic information, application download history, application usage history, user preferences, and/or other information.

The error handler executables 130 may be periodically updated with new, replacement, and/or different error handler executables 130. In some contexts, the data store 118 may be referred to as an error handler executable data store. The dynamic error handling application server 126 may comprise a dynamic error handling mapping table 128. The network component 122 may comprise a dynamic error handling policy engine 124. The mobile communication device 102 may experience a failure, such as a failure to connect to the network 116, and may receive an error code comprising a standardized error code and a business code sent from the network component 122. The standardized error code and the business code may be sent together or separately. In some contexts, the business code may be referred to as a business error code.

The dynamic error handling policy engine 124 may be configured to determine a reason for the failure of the mobile communication device 102 and send a business code that identifies the reason. As discussed, the business code may be sent together with the standardized error code or separately from the standardized error code, however, the business code may also be sent in response to a request from the mobile communication device 102. Different business codes may be sent for different reasons for failure. For example, one business code may be sent when the reason for failure is "X," and a different business code may be sent when the reason for failure is "Y."

In an embodiment, different business codes may be sent based on information contained in the subscriber profile 120 even when the reason for failure is the same. For example, one business code may be sent when the mobile communication device 102 is on a prepaid service plan and the reason for failure is "X," and a different business code may be sent when the mobile communication device 102 is on a postpaid service plan and the reason for failure is "X." Sending different business codes based on subscriber profile 120 information may result in users with different subscriber profile 120 information having different user experiences with regard to failure resolution.

In an embodiment, the mobile communication device 102 may experience a failure and may receive an error code comprising a standardized error code and a business code. If the mobile communication device 102 does not receive a business code with the standardized error code, the mobile communication device 102 may request a business code from the network component 122 and/or the dynamic error handling policy engine 124. The dynamic error handling agent 108 may search the dynamic error handling mapping table 110 for an entry that matches the error code received. The dynamic error handling mapping table 110 may comprise a list of one or more possible error codes. The list of possible error codes may be preprogrammed on the mobile communication device 102. In some cases, the dynamic error handling mapping table 110 may comprise an exhaustive list of all error codes that the mobile communication device 102 may receive from the network 116 to indicate a failure.

For the purposes of this disclosure, a link from an error code listed in the dynamic error handling mapping table 110 to an error handler executable 112 or an error handler executable 130 is referred to as an entry. In an embodiment, the dynamic error handling mapping table 110 may comprise one or more preprogrammed entries that associate specific error codes with a specific error handler executable 112, where a specific error code is a specific standardized error code and business code combination. Alternatively, the dynamic error handling mapping table 110 may not comprise any preprogrammed entries, and entries may be created by requesting error handler executables 130 as described hereinbelow. In an embodiment, the error handler executable 112 or error handler executable 130 linked to the listed error code may be variable based on information in the subscriber profile 120 and/or other information. For example, the link may be variable based on the brand of the mobile communication device 102, the service provider of the mobile communication device 102, the service plan of the mobile communication device 102, user preference, and/or based on other information.

The entries in the dynamic error handling mapping table 110 may link to error handler executables 112. When the dynamic error handling agent 108 finds an entry that matches the error code received, it may execute the error handler executable 112 identified by the entry. The error handler executable 112 may be configured to present an option to a user of the mobile communication device 102, to present instructions to the user, to present information about the reason for the failure to the user, to present other information to the user, and/or to correct the reason for the failure when executed. For example, the error handler executable 112 may present a dialogue box that indicates that the mobile communication device 102 is out of sync with the network 116 and may prompt the user to perform a reboot. Alternatively, the error handler executable 112 may correct the reason for failure by rebooting the mobile communication device 102 without user action.

If the dynamic error handling agent 108 cannot find an entry in the dynamic error handling mapping table 110 that matches the error code received from the network 116, then it may request an error handler executable 130 from the network 116. The request may comprise the error code received by the mobile communication device 102. The request may be received by the dynamic error handling application server 126 which may search the dynamic error handling mapping table 128 for an entry that matches the error code contained in the request.

The entry matching the error code contained in the request may map to an error handler executable 130 in the data store 118 that is configured to remedy the failure identified by the error code. In some cases, a remedy for failure may comprise presenting an option to a user of the mobile communication device 102, presenting a dialogue box that prompts the user to approve an automated remedial response, presenting instructions to the user, presenting information about the reason for the failure to the user, presenting other information to the user, and/or correcting the reason for the failure. The error handler executable 130 identified by the dynamic error handling application server 126 may be sent to the mobile communication device 102.

The dynamic error handling agent 108 may execute the error handler executable 130 upon receipt. In an embodiment, the error handler executable 130 may be configured to function in a substantially similar manner to the error handler executable 112 described hereinabove and may be stored in the memory 107. Following receipt of the error handler executable 130, an entry that matches the error code received by the mobile communication device 102 to error handler executable 130 received from the network 116 may be created in the dynamic error handling mapping table 110. The entry may link to the error handler executable 130 as described above with reference to the error handler executables 112. Creating an entry for the error handler executable 130 received from the network 116 may allow the dynamic error handling agent 108 to address future failures that result in receipt of the same error code without requesting another error handler executable 130.

In some cases, executing an error handler executable 112 or error handler executable 130 may fail to correct the reason for the failure or the failure may reoccur. The mobile communication device 102 and/or the network 116 may identify that the mobile communication device 102 is repeatedly experiencing the same failure. After a predetermined number of failures and/or after a predetermined amount of time without the failure being corrected, the mobile communication device 102 may execute a different error handler executable 112 or error handler executable 130 and/or prompt the user to contact customer care. In some cases, the different error handler executable 112 or error handler executable 130 executed by the mobile communication device 102 may function to prompt the user to contact customer care.

In an embodiment, the error handler executables 112 and/or the error handler executables 130 stored in the memory 107 of the mobile communication device 102 may expire once an expiration rule is satisfied. In some cases, the error handler executables 112 and/or the error handler executables 130 that are expired may be deleted. The expiration rule may be satisfied by a period of time elapsing and/or by some other condition being met. For example, the expiration rule may be satisfied after the error handler executable 112 or error handler executable 130 has been stored in the memory for a predetermined amount of time (e.g., 7 days, for 30 days, for 90 days, for one year, or for some other period of time). The expiration rule may be satisfied if the mobile communication device 102 leaves an area of coverage, if the mobile communication device 102 is rebranded, if service plan of the mobile communication device 102 changes, if the data store 118 is updated with new, replacement, and/or different error handler executables 130, and/or the expiration rule may be satisfied if some other condition is met.

The dynamic error handling agent 108 may periodically search the dynamic error handling mapping table 110 for expired entries. Alternatively, the dynamic error handling agent 108 may be configured to detect the expiration of entries. In an embodiment, the dynamic error handling agent 108 may request a replacement for the expired entry by requesting an appropriate error handler executable 130 from the network 116. The error handler executable 130 may be identified and sent to the mobile communication device 102 as described hereinabove. The dynamic error handling agent 108 may request the replacement immediately upon detection of the expired entry, at a time of low activity on the mobile communication device 102, at night time, between the hours of about 11:00 pm and about 5:00 am, at a time that has been historically been associated with low activity, and/or at some other time.

In some cases, the replacement may be substantially similar to the error handler executable 112 or error handler executable 130 that it replaces; however, in some circumstances, the replacement may be different from the replaced error handler executable 112 or error handler executable 130. For example, if an error handler executable 112 expires because a period of time has passed, then an equivalent error handler executable 130 may be pulled down to replace it. However, if an error handler executable 112 expires because the mobile communication device 102 has left a particular coverage area, e.g., the mobile communication device 102 is in a foreign country, then the error handler executable 130 pulled down from the network may, in some cases, be different from the expired error handler executable 112 and may behave differently when executed. The replacement may be received and linked to the dynamic error handling mapping table 110 as described with reference to receiving the error handler executable 130.

Figure 2:
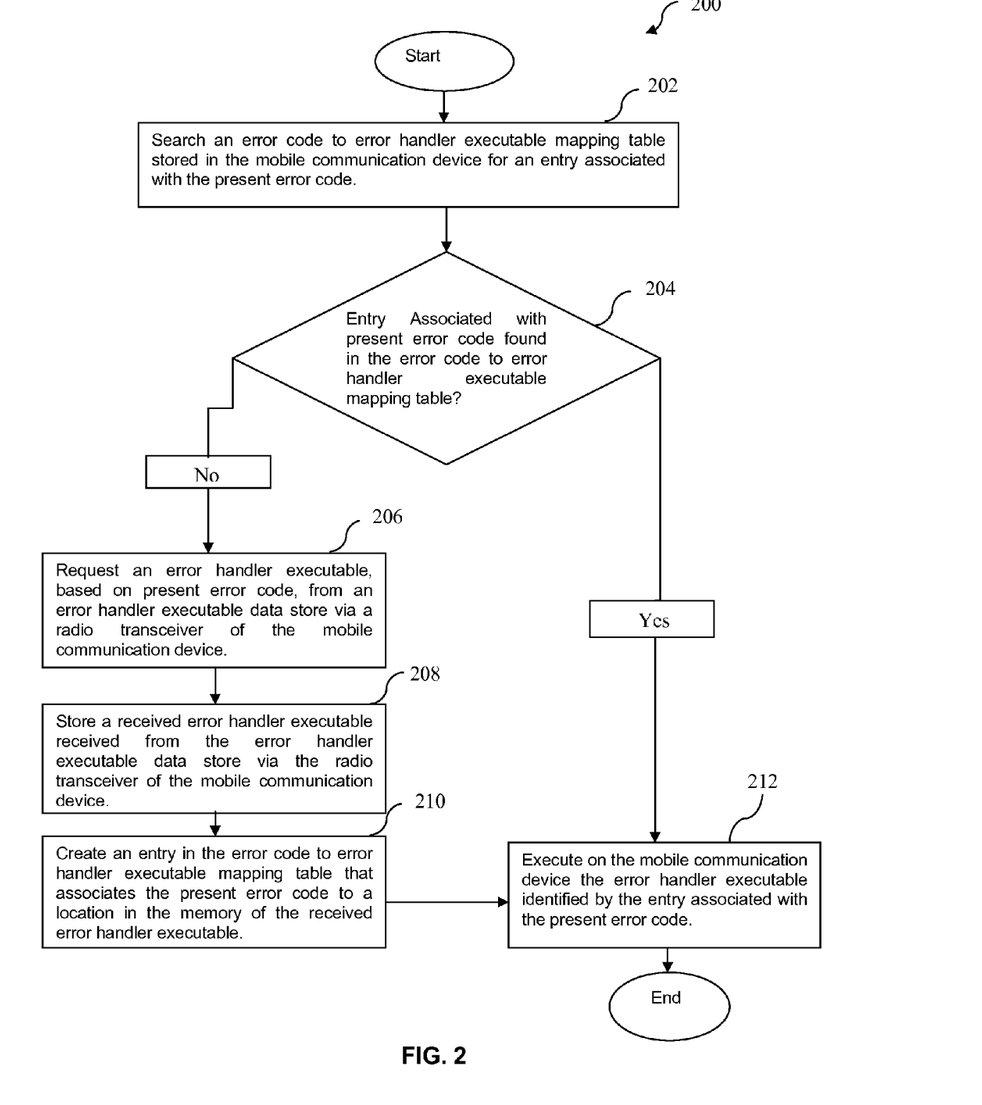
FIG. 2 is a flow chart illustrating a method according to an embodiment of the disclosure.

Turning now to FIG. 2, a method 200 is described. In an embodiment, the method 200 may be performed by one or more elements of the communication system 100 described with reference to FIG. 1. At block 202, a search of an error code to error handler executable mapping table stored in a mobile communication device for an entry associated with a present error code may be performed (e.g., the error code that is received by the mobile communication device 102 and/or by the dynamic error handling agent 108). The present error code may comprise a standardized error code and a business code, wherein the business code may be determined by the mobile communication device. The business code may be determined based on a brand of the mobile communication device, a wireless communication service plan of the mobile communication device, a user profile, and/or on a communication history of the mobile communication device. At a decision point 204, a decision may be made about whether an entry associated with the present error code has been found in the error code to error handler executable mapping table. If an entry is found, then the method may proceed to block 212 as described below.

When there is no matching error code present in the error code to error handler executable mapping table to the present error code that is encountered on the mobile communication device, at block 206, a request to receive an error handler executable may be sent to an error handler executable data store via a radio transceiver of the mobile communication device. The request may comprise information about the present error code and may allow an error handler executable to be identified based on the present error code.

At block 208, a received error handler executable received from the error handler executable data store via a radio transceiver of the mobile communication device may be stored on the mobile communication device. At block 210, an entry in the error code to error handler executable mapping table may be created. The entry may associate the present error code to a location in the memory of the mobile communication device where the received error handler executable is stored. At block 212, the error handler executable identified by the entry associated with the present error code may be executed on the mobile communication device.

Figure 3:
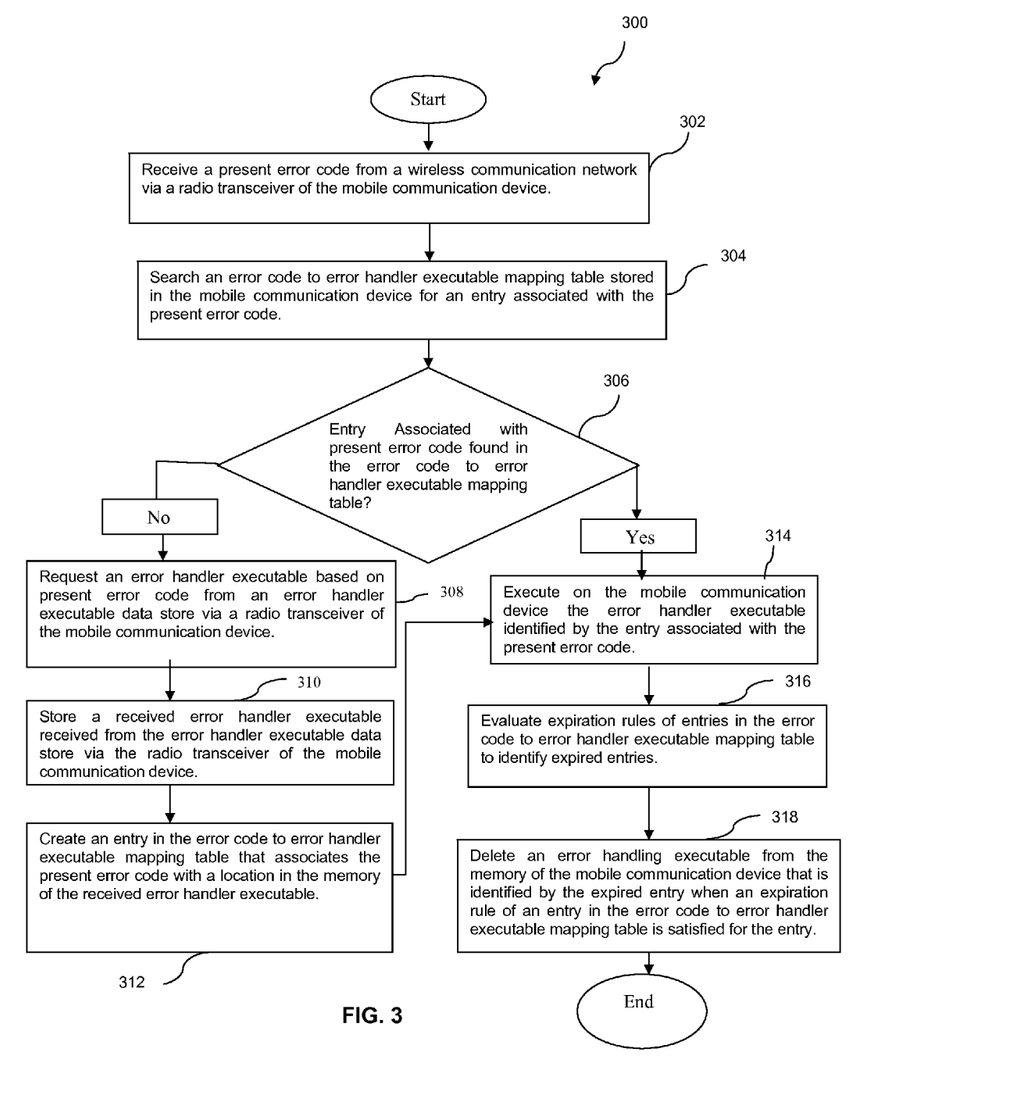
FIG. 3 is a flow chart illustrating another method according to an embodiment of the disclosure.

Turning now to FIG. 3, a method 300 is described. In an embodiment, the method 300 may be performed by one or more elements of the communication system 100 described hereinabove with reference to FIG. 1. While the method 300 is described in the context of receipt of a single present error code, it should be understood that the method 300 may be similarly implemented when a plurality of present error codes are received. If a plurality of present error codes are received, each present error code may map to an entry in the error code to error handler executable mapping table, none of the present error codes may map to an entry in the error code to error handler executable mapping table, or some portion of the present error codes may map to an entry in the error code to error handler executable mapping table and some portion may not.

At block 302, a present error code may be received (e.g., the error code that is received by the mobile communication device 102 and/or by the dynamic error handling agent 108) from a wireless communication network via a radio transceiver of a mobile communication device. At block 304, a search of an error code to error handler executable mapping table stored in the mobile communication device for an entry associated with the present error code may be performed. At decision point 306, a decision may be made concerning whether or not an entry associated with the present error code is found in the error code to error handler executable mapping table. If it is decided that there is an entry associated with the present error code to error handler executable mapping table, then proceed the method may proceed to block 314.

When there is no entry present in the error code to error handler executable mapping table that is associated with the error code that is encountered on the device, in block 308, an error handler executable may be requested based on the present error code from an error handler executable data store via a radio transceiver of the mobile communication device. In block 310, an error handler executable received via the radiofrequency transceiver from the error handler executable data store may be stored on the mobile communication device. In block 312, an entry may be created in the error code to error handler executable mapping table that associates the present error code with a location in the memory occupied by the received error handler executable. Then as shown in block 314, the error handler executable identified by the entry associated with the present error code may be executed on the mobile communication device.

At block 316, expiration rules of entries in the error code to error handler executable mapping table may be evaluated to identify expired entries. At block 318, an error handler executable of the mobile communication device that is identified by an expired entry may be deleted from the memory when an expiration rule of an entry in the error code to error handler executable mapping table is satisfied for the entry. When the error handler executable identified by the expired entry is deleted the entry in the error code to error handler executable mapping table may be modified to contain a null reference to an error handler executable. The error code to error handler executable mapping table may be analyzed periodically to identify null references to error handler executable and when a null reference is identified requesting a current error handler executable based on the error code associated to the null reference. In an embodiment, a dynamic error handling agent, such as the dynamic error handling agent 108 described with reference to FIG. 1, may detect the expired entry and update the entry in the error code to error handler executable mapping table and/or update the error handler executable associated with the expired entry as described above with reference to FIG. 1.

Figure 4:
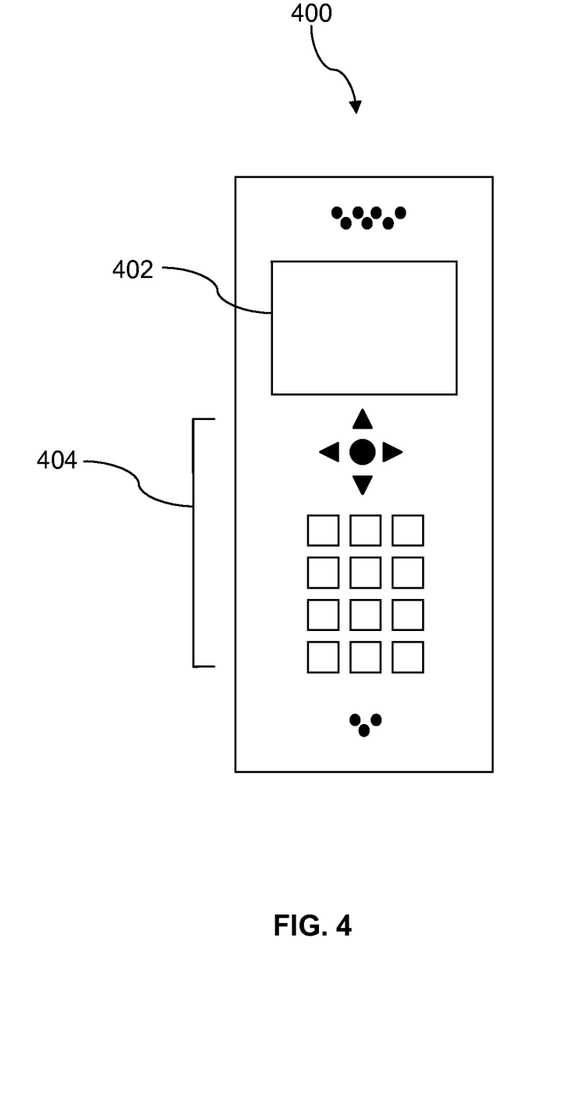
FIG. 4 is an illustration of a mobile communication device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
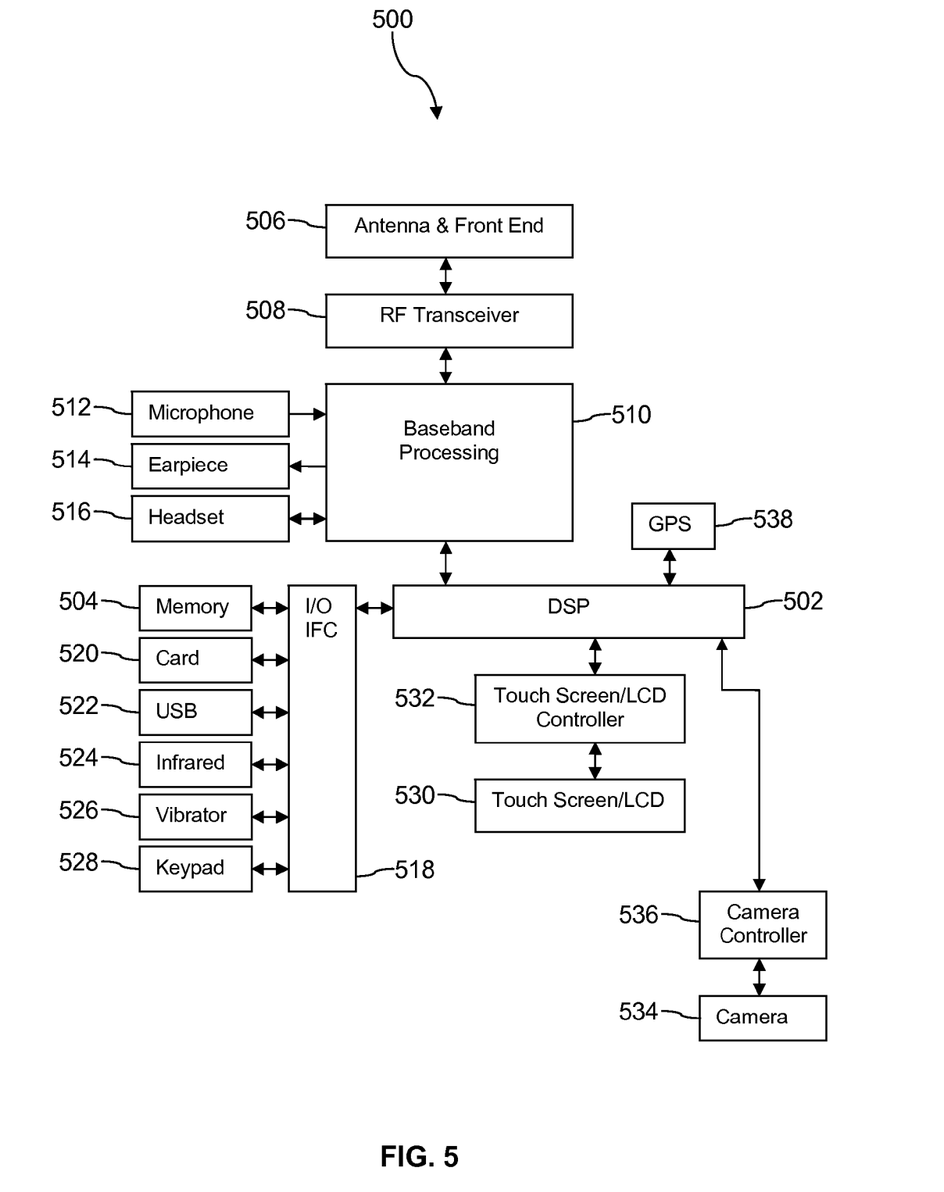
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. In an embodiment, the memory 504 has a system partition, a carrier partition, and a user partition, wherein an operating system of the mobile device 400 restricts write access to system partition based on an original equipment manufacturer (OEM) access password and restricts write access to the carrier partition based on a wireless communication service carrier access password.

As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
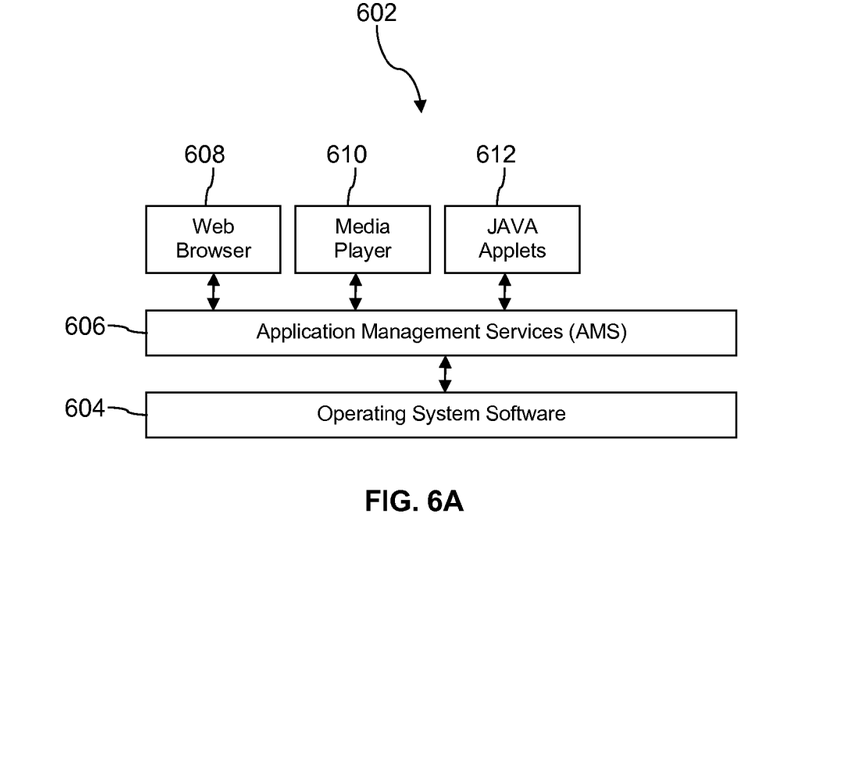
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and the mobile application 106. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The mobile application 106 is described above.

Figure 6B:
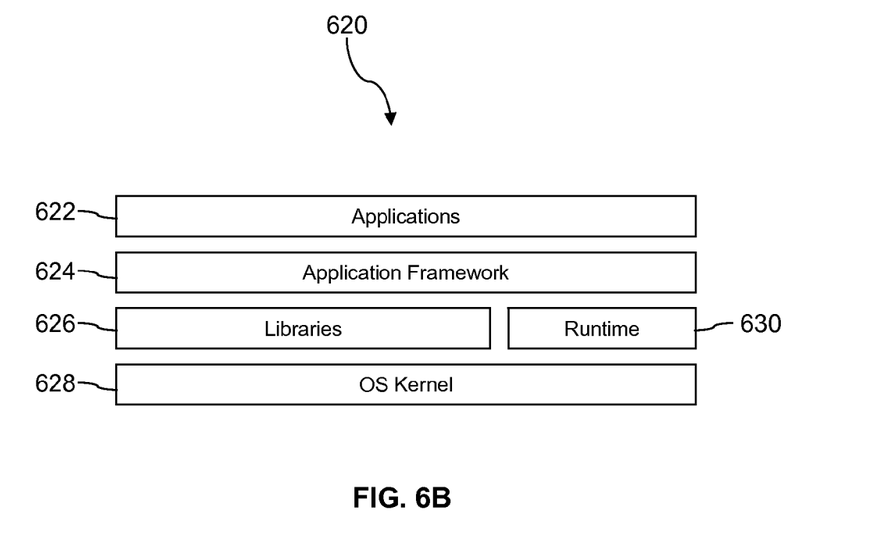
FIG. 6B is a block diagram of another software architecture of a mobile communication device according to an embodiment of a disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626. The mobile application 106 described above may be among the applications 622.

Figure 7:
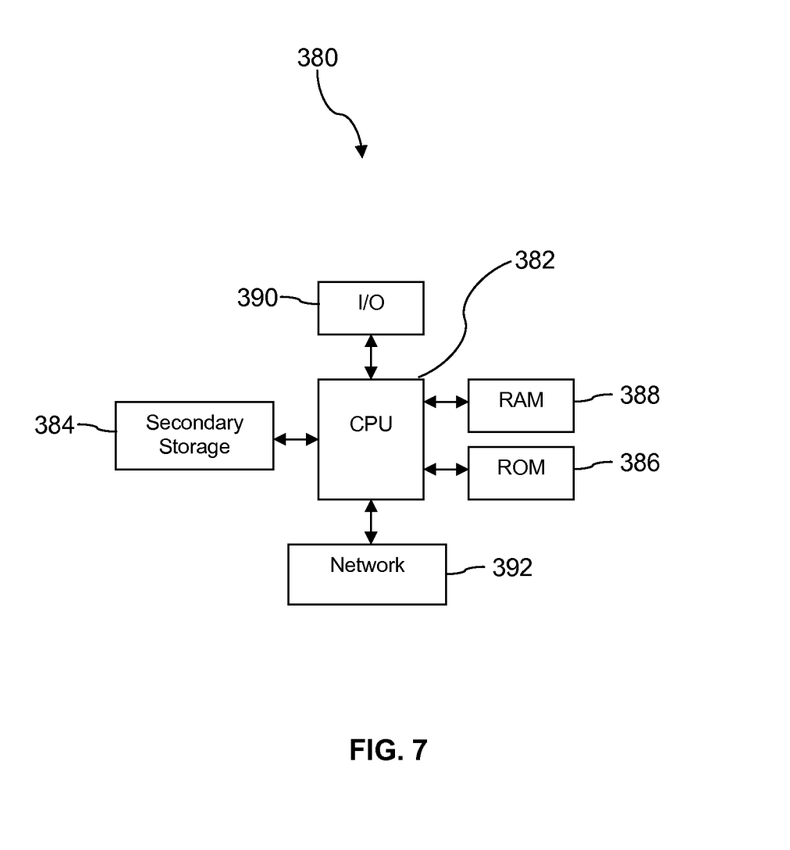
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors; liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
 a radio transceiver;
 a processor;
 a non-transitory memory; and
 an application stored in the non-transitory memory that, when executed by the processor,
  analyzes an error code received via the radio transceiver, where the error code comprises a standardized error code and a business error code,
  searches a mapping table stored in the mobile communication device based on the error code, wherein the mapping table comprises a plurality of links between error codes and error handler executables, and wherein entries in the mapping table comprise an expiration condition,
  in response to a determination that the error code is associated with an entry in the mapping table stored on the mobile communication device, invokes an error handler executable identified by the entry, and
  deletes at least one error handler executable from the non-transitory memory when the expiration condition of a corresponding entry in the mapping table is satisfied.

2. The mobile communication device of claim 1, wherein the error code is received via the radio transceiver from a policy engine executed by a computer system in a wireless communication service provider network, where the policy engine determines the business error code component of the error code based on at least one of a brand of the mobile communication device, a subscription plan associated with the mobile communication device, and a user profile associated with the mobile communication device.

3. The mobile communication device of claim 1, wherein the non-transitory memory comprises a system partition, a carrier partition, and a user partition, wherein an operating system of the mobile communication device restricts write access to system partition based on an original equipment manufacturer (OEM) access password and restricts write access to the carrier partition based on a wireless communication service carrier access password.

4. The mobile communication device of claim 3, wherein the application is stored in the system partition.

5. The mobile communication device of claim 1, wherein the expiration condition is at least one of an expiration date condition and a location condition.

6. The mobile communication device of claim 1, wherein the application further requests a current error handler executable based on the error code after the expiration condition of an entry in the mapping table is satisfied.

7. A method of handling a communication error on a mobile communication device, comprising:
 searching, by an application stored in a non-transitory memory of a mobile communication device and executed by a processor of the mobile communication device, a mapping table stored in the mobile communication device for an entry associated with a present error code, wherein the mapping table comprises a plurality of links between error codes and error handler executables, and wherein entries in the mapping table comprise an expiration condition;
 when an entry associated with the present error code is not found in the mapping table,
  requesting, by the application, an error handler executable based on the present error code from an error handler executable data store via a radio transceiver of the mobile communication device;
  storing, by the application, a received error handler executable in the non-transitory memory of the mobile communication device;
  creating, by the application, an entry in the mapping table that associates the present error code to a location in the non-transitory memory of the received error handler executable; and
  executing, by the application, the received error handler executable; and
 deleting, by the application, at least one error handler executable from the non-transitory memory when the expiration condition of a corresponding entry in the mapping table is satisfied.

8. The method of claim 7, wherein the received error handler executable, when executed, causes a message to be presented on the mobile communication device related to the present error code associated with the received error handler executable in the mapping table.

9. The method of claim 7, wherein the received error handler executable, when executed, causes a dialog box to be presented on the mobile communication device related to the present error code associated with the received error handler executable in the mapping table, wherein the dialog box prompts a user of the mobile communication device to approve automated performance of remedial action on the mobile communication device.

10. The method of claim 7, wherein the present error code comprises a standardized error code and a business error code.

11. The method of claim 10, further comprising:
receiving the standardized error code via the radio transceiver; and
determining, by the mobile communication device, the business error code based on at least one of a brand of the mobile communication device, a wireless communication service plan of the mobile communication device, a user profile of the mobile communication device, and a communication history of the mobile communication device.

12. The method of claim 10, further comprising:
receiving the standardized error code via the radio transceiver;
sending a request for the business error code to a policy engine executed by a computer system in a wireless communication service provider network, wherein the request comprises information about a recent communication history of the mobile communication device; and
receiving the business code via the radio transceiver.

13. The method of claim 7, further comprising updating the mapping table by requesting a current error handler executable associated with an error code.

14. The method of claim 13, wherein the updating is performed periodically.

15. The method of claim 13, wherein the updating is performed in response to an event.

16. A method of handling a communication error on a mobile communication device, comprising:
receiving, by an application stored in a non-transitory memory of a mobile communication device and executed by a processor of the mobile communication device, a plurality of present error codes from a wireless communication network via a radio transceiver of the mobile communication device;
searching, by the application, a mapping table stored in the non-transitory memory of the mobile communication device for a first entry associated with a first present error code of the plurality of present error codes, wherein the mapping table comprises a plurality of links between error codes and error handler executables, and wherein entries in the mapping table comprise an expiration condition;
in response to finding the first entry associated with the first present error code in the mapping table, executing on the mobile communication device an error handler executable associated with the first present error code and identified by the first entry;
searching, by the application, the mapping table for a second entry associated with a second present error code of the plurality of error codes;
in response to a determination that the mapping table does not comprise the second entry associated with the second present error code, requesting, by the application, an error handler executable based on the second present error code from an error handler executable data store via a radio transceiver of the mobile communication device;
storing, by the application, an error handler executable received from the error handler executable data store in the non-transitory memory of the mobile communication device;
creating, by the application, an entry in the mapping table that associates the second present error code with a location in the non-transitory memory of the received error handler executable;
executing, by the application, the received error handler executable; and
deleting, by the application, at least one error handler executable from the non-transitory memory when the expiration condition of a corresponding entry in the mapping table is satisfied.

17. The method of claim 16, further comprising:
modifying, by the application, the corresponding entry in the mapping table to contain a null reference to an error handler executable when the at least one error handling executable is deleted from the non-transitory memory of the mobile communication device in response to satisfaction of the expiration condition;
analyzing, by the application, the mapping table to identify null references to error handler executables; and
in response to identification of any null reference, requesting, by the application, a current error handler executable based on an error code associated to the identified null reference.

* * * * *